United States Patent [19]

Leuschner et al.

[11] 3,855,575

[45] Dec. 17, 1974

[54] ULTRASONIC REMOTE CONTROL RECEIVER

[75] Inventors: Horst Leuschner, Dallas, Tex.; Bruno Gerhard Viereck, Marzling, Germany

[73] Assignee: Texas Instruments Incorporated, Dallas, Tex.

[22] Filed: Apr. 24, 1973

[21] Appl. No.: 354,025

[30] Foreign Application Priority Data

May 3, 1972 Germany.......................... 2221559

[52] U.S. Cl.......... 340/167 R, 340/148, 340/171 R, 325/325

[51] Int. Cl........................... H04q 9/00, H04b 1/06

[58] Field of Search.................... 325/392, 325, 320; 340/148, 171 R, 167 R, 164 R; 329/104; 343/225

[56] References Cited

UNITED STATES PATENTS 3,551,815 12/1970 Berman.......................... 340/164 R 3,611,297 10/1971 Kramer et al.................. 340/148 X 3,611,298 10/1971 Jacobson........................ 325/320 X

*Primary Examiner*—Donald J. Yusko

*Attorney, Agent, or Firm*—Harold Levine; James O. Dixon

[57] ABSTRACT

An ultrasonic remote control receiver wherein an incoming ultrasonic signal is converted to square wave pulses of the same frequency by a Schmitt trigger circuit; digital circuits are thereafter used to count pulses resulting from the incoming signal over a predetermined period of time; a decoder activates one of a plurality of outputs in dependance to the number of pulses counted, provision is made to prevent interference signals from producing undesired control outputs.

9 Claims, 9 Drawing Figures

ULTRASONIC REMOTE CONTROL RECEIVER

The invention relates to an ultrasonic remote control receiver for receiving signals having different useful frequencies each associated with a channel, comprising a plurality of outputs which are each associated with one of the channels and from which a control signal is emitted on receipt of a signal having the corresponding useful frequency.

To obtain the simplest possible transmitter construction in ultrasonic remote control, modulation of the emitted ultrasonic frequencies is not employed; to control different operations different frequencies are emitted which must be recognized in the receiver and evaluated for carrying out the different functions associated therewith. Presently, to recognize the different frequencies, use is made of resonant circuits, each of which contains one or more coils tuned in each case together with a capacitor to one of the useful frequencies.

These hitherto known receivers have numerous disadvantages. Thus, for example, before starting operation of the receiver a time-consuming alignment procedure must be carried out with which the resonant frequencies of the individual resonant circuits are set. Since it is inevitable that with time the resonant circuits become detuned, it may be necessary to repeat the alignment procedure.

A further disadvantage is that the known receivers cannot be made by integrated techniques because the coils used therein are not suitable for such techniques.

The problem underlying the invention is thus to provide an ultrasonic remote control receiver of the type mentioned at above which is extremely simple to set and in addition can be made by integrated techniques.

To solve this problem, according to the invention an ultrasonic remote control receiver of the type mentioned above contains a counter for counting the useful frequency oscillations received during a fixed measuring time, a sequence control device which determines the measuring time and which is started on receipt of a useful frequency, and a decoder comprising several outputs which is connected to the outputs of the counter, said decoder emitting a control signal at the output associated with the count reached at the end of the measuring time.

In the receiver constructed according to the invention the frequency emitted by the transmitter is identified by counting the oscillations received during a measuring time. The evaluation of the count reached at the end of the measuring time takes place in a decoder which emits a control signal at a certain output according to the count. The measuring time is fixed by a sequence control device which is set in operation on receipt of useful frequency signals.

In such a receiver the only quantity which has to be exactly fixed is the measuring time; it is therefore no longer necessary to align components to certain frequencies. Since no coils are required, the novel receiver can also be made up of integrated circuits.

A further development of the invention resides in that an interference identifying device is provided which on receipt of interference frequencies differing from the useful frequencies interrupts the operation of the sequence control device.

Hitherto known ultrasonic remote control receivers respond to any oscillation received if the frequency thereof has a value which excites a resonant circuit in the receiver. There is no way of distinguishing between oscillations received from the remote control transmitter and from interference sources.

Interfering ultrasonic oscillations may be due to many different causes. For example, noises such as hand clapping, rattling of short keys such as safety keys, operating cigarette lighters, rattling of crockery and the like cover a frequency spectrum reaching from the audio frequency range far into the ultrasonic region. The ultrasonic components may have the effect of simulating a useful frequency and cause an erroneous function in the receiver.

The interference identifying device according to the further development is constructed in such a manner that it recognizes oscillations having frequencies deviating from the useful frequencies and as a result of this recognition switches off the sequence control device. This switching off prevents the counter state reached from being passed to the decoder and consequently the latter cannot emit an erroneous control signal.

With this further development of the ultrasonic remote control receiver the operation of equipment such as radio and television sets is made extremely reliable and interference-free. During the operation of such a set it is no longer possible for the remote control to become operative, triggered by interference noises, eliminating for example the possibility of unintentional program or volume changes.

Examples of embodiment of the invention are illustrated in the drawings, wherein.

Figure 1:
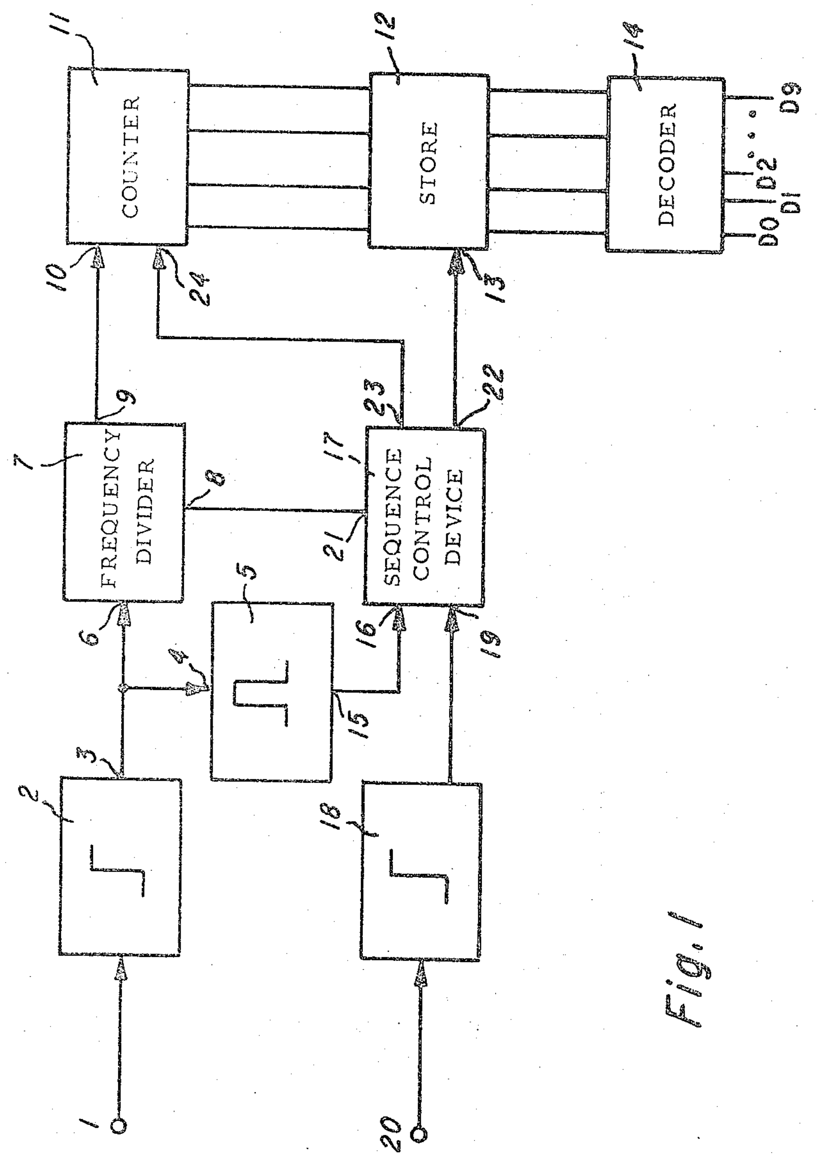
FIG. 1 shows a block circuit diagram of a remote control receiver according to the invention.

The ultrasonic remote control receiver shown in FIG. 1 comprises an input 1 which is connected to an ultrasonic microphone intended to receive ultrasonic signals coming from a remote control transmitter. For each function to be performed by the receiver the remote control transmitter emits one of several unmodulated different useful frequencies which are spaced from each other a constant channel spacing $\Delta f$ and which all lie within a useful frequency band.

To obtain a signal which is as free as possible from noise at the input 1, a band filter and a limiting amplifier are preferably incorporated between the ultrasonic microphone and the input 1. The band filter may be made up of two active filters whose resonant frequencies are offset with respect to each other so that a pass band curve in the useful frequency band is obtained which is as flat as possible.

The input 1 leads to a Schmitt trigger 2 which converts the electrical signal applied thereto with the frequency of the ultrasonic signal to a sequence of rectangular pulses. The output 3 of the Schmitt trigger 2 is connected to the input 6 of a frequency divider 7 which is in operation for the duration of a control pulse applied to its control input 8 and divides the recurrence frequency of the pulses supplied thereto at the input 6 thereof in a constant division ratio. The output 9 of the frequency divider 7 is connected to the input 10 of a counter 11 which counts the pulses coming from the frequency divider 7. The counter 11 is a four-stage binary counter whose stage outputs are connected to the inputs of a store (register) 12 which is so constructed that on application of a control pulse to the input 12 thereof it takes on the counter state in the counter 11 and stores said counter state until the next pulse at the input 13. The stage outputs of the store 12 are fed to the inputs of a decoder 14 which decodes the counter state contained in the store 12 in such a manner that a control signal is emitted at that one of its outputs D0 to D9 which is associated with the decoded counter state.

The output 3 of the Schmitt trigger 2 is also connected to the input 4 of a monoflop 5 which is brought into its operating state by each pulse at the output 3 of the Schmitt trigger. It returns from this operating state to its quiescent state after expiration of a hold time depending on its intrinsic time constant if it does not receive a new pulse prior to expiration of this hold time. It is held in the operating state by each pulse received during the hold time until it finally flops back into the quiescent state when the interval between two successive pulses is greater than its hold time.

The output 15 of the monoflop circuit 5 is connected to the input 16 of a sequence control device 17 which is set in operation by the signal emitted in the operating state of the monoflop 5. Supplied to the sequence control device by 17 via a Schmitt trigger 18 at a control input 19 are pulses having a recurrence frequency derived from oscillations of the same frequency, for example, twice the mains frequency of 100 c/s, applied to the input 20. The sequence control device 17 is so constructed that in a cyclically recurring sequence in time with the pulses supplied to it at the input 19 it emits pulses at the outputs 21, 22 and 23 whose duration is equal to the period of the oscillation applied to the input 20. The output 21 of the sequence control device 17 is connected to the control input 8 of the frequency divider 7, the output 22 is connected to the control input 13 of the store 12 and the output 23 thereof is connected to the reset input 24 of the counter 11.

Figure 2:
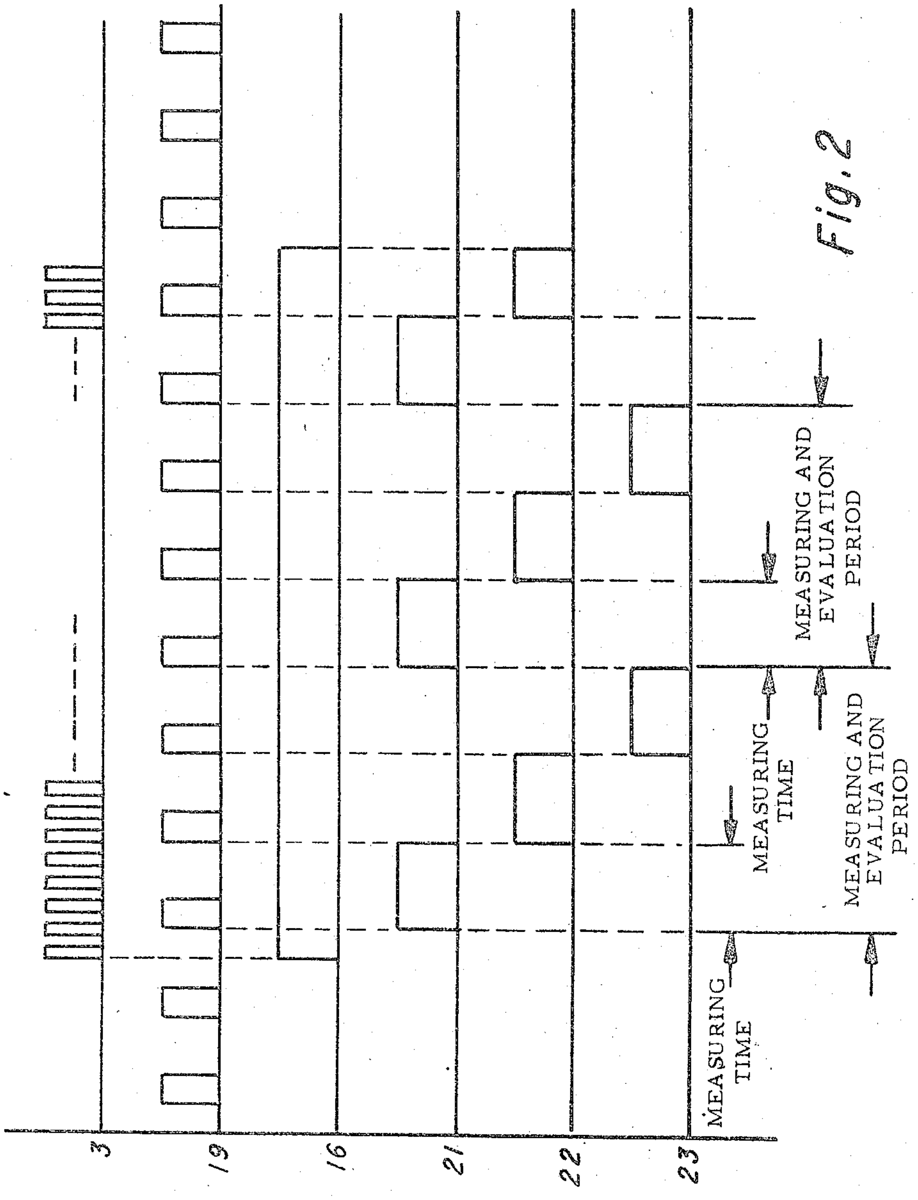
FIG. 2 is a diagram explaining the mode of operation of the circuit according to FIG. 1.

The mode of operation of the circuit of FIG. 1 will now be explained with the aid of the diagram of FIG. 2 which shows the variation with time of the signals at the output 3 of the Schmitt trigger 2 and at the inputs 16 and 19 as well as the outputs 21, 22 and 23 of the sequence control device 17.

It will be assumed that a useful frequency oscillation is being received at the input 1. The Schmitt trigger 2 then emits at the output 3 rectangular pulses whose recurrence frequency is equal to the frequency of said useful frequency oscillation. The first pulse emitted by the Schmitt trigger 2 puts the monoflop 5 into its operating state. The hold time of the monoflop 5 is so dimensioned that for all useful frequencies occurring it is longer than the recurrence period of the rectangular pulses emitted at the output 3. The monoflop 5 therefore remains in its operating state for as long as the useful frequency oscillation is applied to the input 1 and supplies to the control input 16 of the sequence control device 17 a control signal throughout this time.

Due to the control signal applied to the input 16 the sequence control device 17 emits at its outputs 21, 22 and 23 in time with the pulses supplied to it via the Schmitt trigger 18 at the input 19 mutually offset control pulse sequences, the duration of the control pulses being equal to the time interval of the leading edges of the pulses supplied at the input 19 and thus equal to the period of the oscillation applied to the input 20 and the pulse sequences being offset with respect to each other by one pulse duration. The control pulses emitted by the sequence control device 17 perform the following functions:

a. The first control pulse appearing at the output 21 sets in operation for its duration via the input 8 the frequency divider 7 so that the latter divides the recurrence frequency of the pulses supplied thereto from the Schmitt trigger 2 and thus the frequency of the useful frequency oscillations received in a constant ratio and passes counting pulses to the input 10 of the counter 11 with a correspondingly reduced recurrence frequency.

b. Via the input 13 the second pulse occurring at the output 22 causes the store 12 to take on and to store the count of the counter 11 reached at the end of the first control pulse.

c. The third control pulse appearing at the output 23 resets the counter 11 via the reset input 24.

Control pulse sequences continue to be emitted for as long as the monoflop 5 remains in its operating state.

Since the stage outputs of the store 12 are permanently connected to the inputs of the decoder 14, the store content is continuously being decoded. The decoder 14 therefore emits a control signal at the output which is associated with the count contained in the store.

During each group of three offset control pulses of the three control pulse sequences emitted by the sequence control device 17, the counter 11 receives counting pulses from the frequency divider 8 only for the duration of the control pulse of the first control pulse sequence emitted at the output 21. The duration of this control pulse thus determines the measuring time during which the oscillations of the useful frequency signal received are counted. Since the duration of the control pulses emitted by the sequence control device 17 is however equal to the period of the oscillation applied to the input 20, the measuring time is fixed by the period of said oscillation.

The frequency divider 7 is connected in front of the counter 11 so that a small capacity of the counter 11 is sufficient to obtain a clear indication of the received frequency even when the measuring time is so long that a large number of periods of the useful frequency oscillation is received during the measuring time. This is for example, the case when the oscillation supplied to the input 20 has twice the mains frequency. Since the frequency divider 7 divides the frequency of the useful frequency oscillations received in the constant ratio $k$, the counter 11 need count only the oscillations having a correspondingly reduced frequency. If the division ratio $k$ of the divider 7 is so set that it is equal to the product of the measuring time $t$ and channel spacing $\Delta f$, only a frequency which differs by at least the channel spacing $\Delta f$ from a previously received frequency will change the count of the counter 11.

The purpose of the monoflop 5 is to prevent interference frequencies supplied to the input 1 from producing at one of the outputs D0 to D9 of the decoder 14 a control signal which could lead to an erroneous function of the equipment being controlled. The interference sources usually encountered emit a frequency spectrum whose components lie predominantly in the audio region, i.e., below the ultrasonic region. If the hold time of the monoflop 5 is set to a value slightly greater than the period of the smallest useful frequency but smaller than the period of the highest interference frequency occurring, the monoflop 5 returns to its quiescent state before the end of the period of an interference frequency. Since in this state no signal is supplied to the control input 16 of the sequence control device 17, the latter is put out of operation and consequently the received signal cannot be evaluated because the count of the counter 11 is not transferred to the store 12 and thus no decoding takes place.

To facilitate understanding of the invention, the function of the circuit of FIG. 1 will now be explained numerically by way of example. The channel spacing $\Delta f$ will be taken as 1,200 c/s so that for a frequency of 100 c/s of the oscillation applied to the input 20 and thus a measuring time of 10 ms a division ratio of the frequency divider 7 of $k = t \cdot \Delta f = 12$ results. It will further be assumed that ten different channel frequencies are to be evaluated; the counter 11 is therefore so connected that it has a capacity of 10. With these values, during the measuring time the counter 11 runs through several count cycles. This means that for the received frequency during the measuring time the counter 11 reaches its maximum count several times and then starts counting again from the beginning. The count reached at the end of the measuring time is however still a clear indication of the received useful frequency provided the number of useful frequencies having a channel spacing $\Delta f$ is at the most equal to the counter capacity Z. The relationship between the useful frequency $f$ received and the count reached at the end of each measuring time $t$ while this useful frequency is being received is expressed by the following equation:

$$f = (k/t) \cdot (n \cdot Z + m + 0.5)$$

wherein $f$ = useful frequency received in c/s
$t$ = measuring time in seconds
$k$ = division ratio of the frequency divider 7
$Z$ = capacity of the counter 11
$n$ = number of count cycles passed through (integral)

$m$ = count

The term 0.5 in brackets is a correction factor which ensures that a new count is reached whenever the received frequency differs at least by half the channel spacing $\Delta f$ from the channel center frequency of the neighboring channel. With a channel spacing $\Delta$ of 1,200 c/s, a measuring time $t$ of 10 ms, a division ratio $k$ of the frequency divider 7 of 12, a capacity Z of the counter 11 of 10 and an input frequency $f$ of 33 $k$ c/s, the count 7 is for example reached after two complete count cycles. This is because the input frequency of 33 $k$ c/s is first divided by 12 by the frequency divider 7 so that pulses having a recurrence frequency of 2.750 $k$ c/s reach the input 10 of the counter 11. Since the frequency divider 7 emits counting pulses only during the measuring time of 10 ms, during said time only 27.5 pulses reach the input 10 of the counter 11. For this number of pulses the counter thus runs through two complete cycles and finally stops at the count 7. Similarly, for an input frequency of 39 $k$ c/s the counter stops at the count 2 after passing through three complete counter cycles. With the numerical values given up to 10 different frequencies may be received without any ambiguity occurring in the evaluation.

Figure 3:
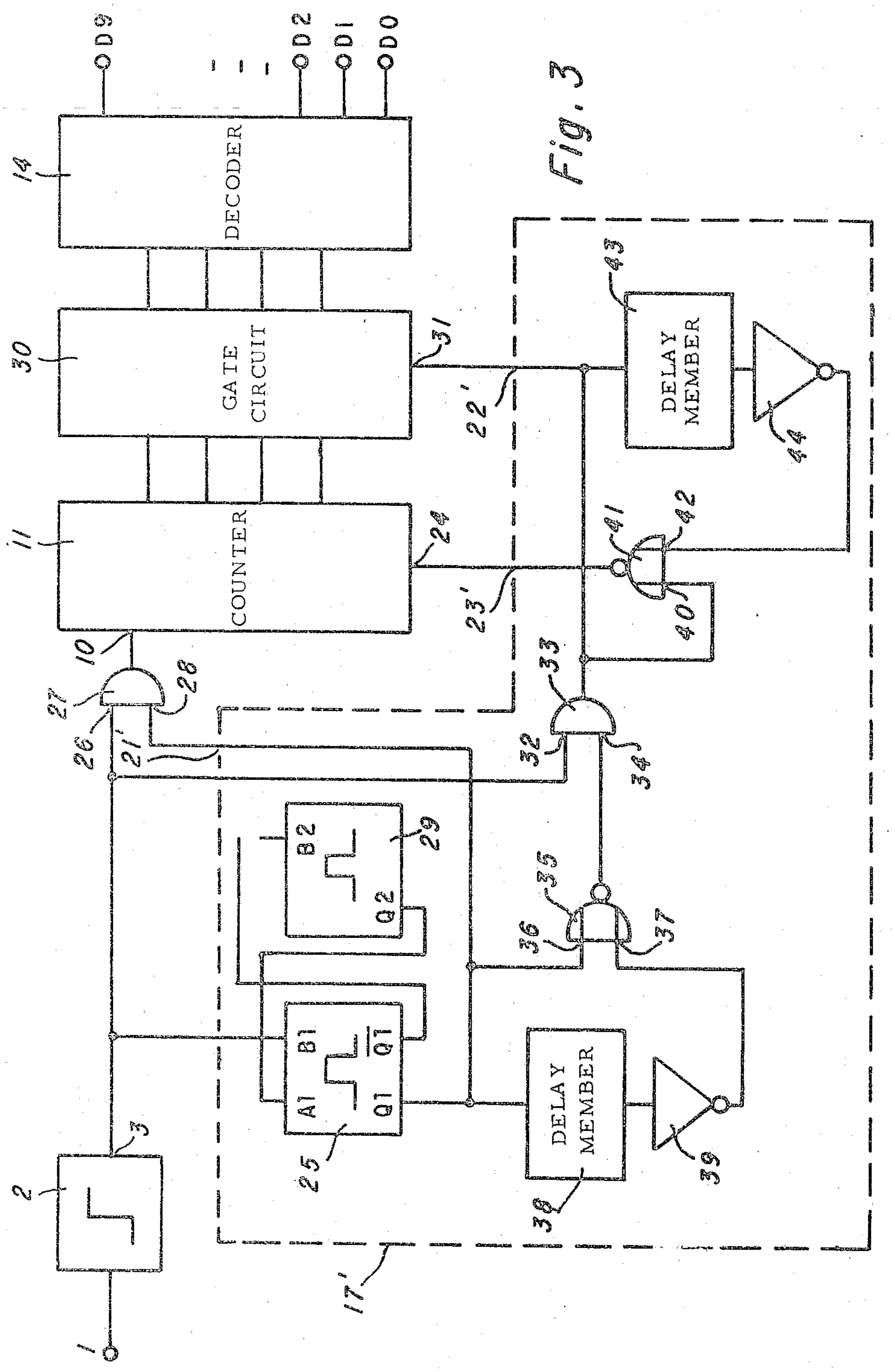
FIG. 3 shows another embodiment of the invention.

FIG. 3 illustrates a further embodiment of an ultrasonic remote control receiver which differs from the embodiment described above primarily in that to fix the measuring time it is not necessary to supply a reference frequency. In the illustration of FIG. 3 the same reference numerals as in FIG. 1 are used for identical circuit components. The part of the circuit enclosed in the dashed line represents the sequence control device 17' which emits at its outputs 21', 22', 23' control signals which have substantially the same functions as the control signals emitted at the outputs 21, 22 and 23 of the sequence control device 17 of FIG. 1.

The useful frequency signal received is again supplied to the input 1. The input 1 is connected to the input of the Schmitt trigger 2 which again converts the input useful frequency oscillations into a sequence of pulses whose recurrence frequency is equal to the input useful frequency. The output 3 of the Schmitt trigger 2 is connected to the input B1 of a monoflop 25 which is contained in the sequence control device 17' and which is so constructed that it is switched to its operating state by a pulse received at the input B1 but during its hold time cannot be tripped again by any further pulse. The output 3 of the Schmitt trigger 2 is also connected to the input 26 of an AND gate 27 whose other input 28 is connected to that output 21' of the sequence control device 17' which is directly connected to the output Q1 of the monoflop 25. The output $\overline{Q1}$ of the monoflop 25 which emits the signal complementary to the signal at the output Q1 is connected to the input B2 of a further monoflop 29 whose output Q2 is connected to the input A1 of the monoflop 25. The input 10 of the counter 11 is connected to the output of the AND gate 27. The stage outputs of the counter 11 are connected to the inputs of a gate circuit 30 which on receipt of a control pulse at its input 31 transfers the count contained in the counter 11 to the decoder 14 connected to its outputs. In the decoder 14 the count is then decoded in the manner already explained in conjunction with FIG. 1 so that a control signal is emitted at the output corresponding to the transferred count.

The output 3 of the Schmitt trigger 2 is further connected to the input 32 of an AND gate 33 which is contained in the sequence control circuit 17' and the other input 34 of which is connected to the output of a NOR gate 35. The output Q1 of the monoflop 25 is directly connected to one input 36 of the NOR gate 35 and is connected to the other input 37 via a delay member 38 and an inverter 39.

The output of the AND gate 33 represents the output 22' of the sequence control circuit 17' which is directly connected to the control input 31 of the gate circuit 30. In addition, the output of the AND gate 33 is directly connected to one input 40 of a NOR gate 41 and to the other input 42 thereof via a delay member 43 and an inverter 44. The output of the NOR gate 41 represents the output 23' of the sequence control circuit 17', to which output the reset input 24 of the counter 11 is connected.

Figure 4:
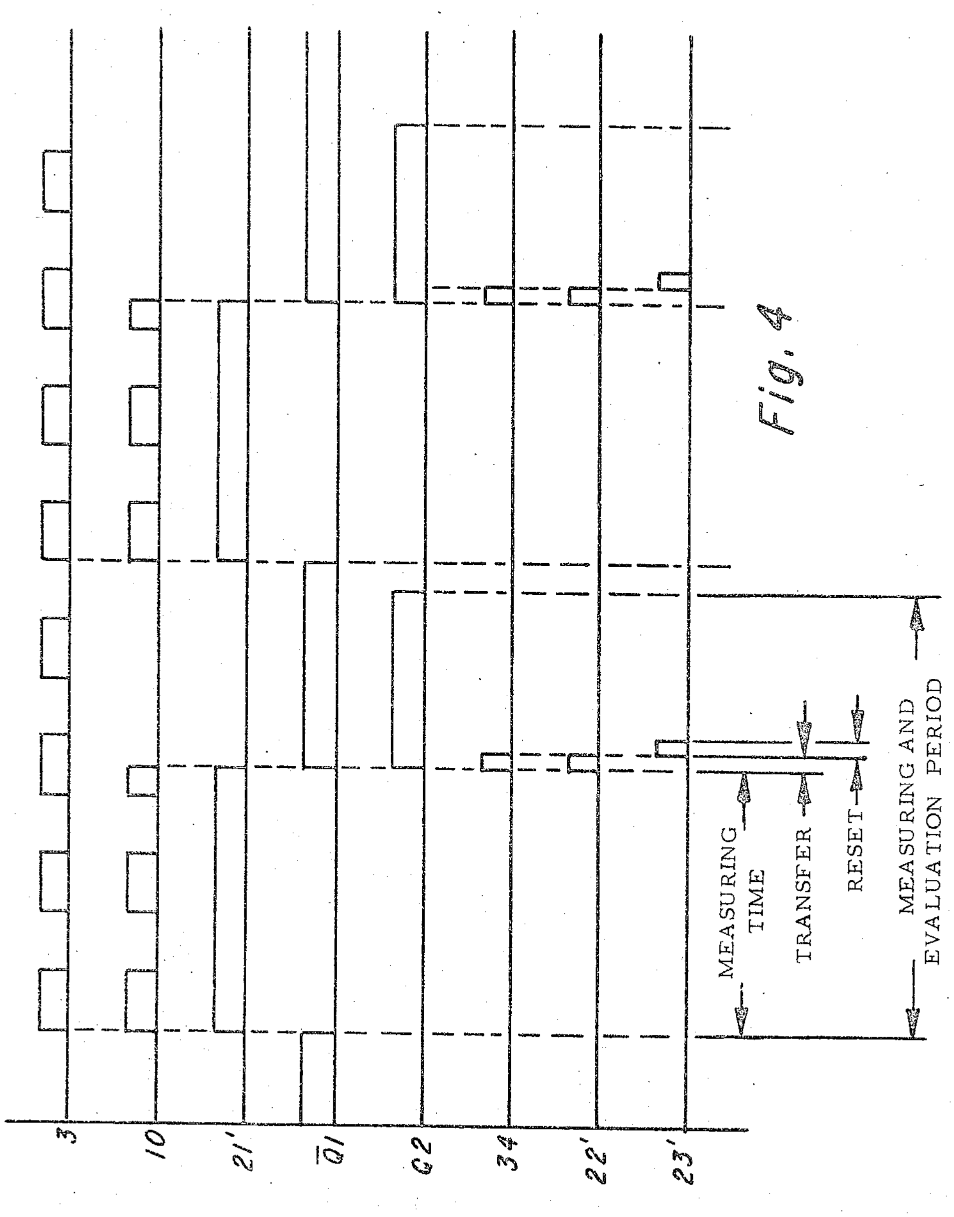
FIG. 4 is a diagram explaining the mode of operation of the circuit according to FIG. 3.

The mode of operation of the circuit of FIG. 3 is explained in FIG. 4. Since the measuring time in the arrangement of FIG. 3 is substantially shorter than in the arrangement of FIG. 1, the time scale in FIG. 4 has been enlarged compared with FIG. 2 in order to clarify the illustration. When useful frequency oscillations are supplied to the input 1 of the receiver, pulses whose recurrence frequency is equal to the useful frequency appear at the output 3 of the Schmitt trigger 2. It will be assumed that the presence of a pulse corresponds to the logical signal value 1 whereas a pulse space represents the logical signal value 0. The leading edge of the first pulse at the output 3 puts the monoflop 25 into its operating state in which it emits the signal value 1 for the duration of its hold time at its output Q1, resulting in the control pulse at the output 21', which passes to the input 28 of the AND gate 27. Since the other input 26 of the AND gate 27 is directly connected to the output 3 of the Schmitt trigger 2, for the duration of each pulse at the output 3 the signal value 1 is also applied to the input 26 of the AND gate 27. Thus, the pulses occurring at the output 3 of the Schmitt trigger 2 are transferred for the duration of the control pulse at the output 21', i.e. during the hold time of the monoflop 25, as count pulses to the counter 11 and counted by the latter. The hold time of the monoflop 25 thus determines the measuring time; the capacity of the counter 11 must be greater than the number of pulses received during the measuring time for the greatest useful frequency. The count of the counter 11 reached at the end of the measuring time is then a clear indication of the received useful frequency.

When the monoflop 25 flops back into the quiescent state at the end of its hold time, it applies the signal value 0 via its output Q1 to the input 28 of the AND gate 27 so that no further count pulses can enter the counter 11. At the same time there appears at the output $\overline{Q1}$ of the monoflop 25 the signal value 1 which at the input B2 puts the monoflop 29 into the operating state. In this state the monoflop 29 emits at its output Q2 the signal value 1 which blocks the monoflop 25 via the input A1 for the duration of the hold time of the monoflop 29 in such a manner that it cannot be switched into the operating state by pulses at the input B1. This is necessary to enable the sequence control device 17' to have sufficient time to generate the control pulses appearing at the outputs 22' and 23' for the transfer of the count or resetting of the counter.

With the return of the monoflop 25 to its quiescent state, the signal value 0 passes to the input 26 of the NOR gate 35 directly connected to the output Q1. During the operating state of the monoflop 25 the signal value 0 is applied with a delay determined by the delay member 38 via the inverter 39 to the input 37 of the NOR gate 35, said signal value 0 being replaced by the signal value 1 only after the delay time of the delay member 38 and not simultaneously with the flop back of the monoflop 25. Thus, for the duration of this delay time the signal value 0 is applied to both inputs 36 and 37 of the NOR gate 35 and consequently for this period of time the signal value 1 appears at the output of the NOR gate 35. The circuits 35, 38, 39 thus effect the generation of a short pulse which immediately follows the return of the monoflop 25 and the duration of which is determined by the delay of the delay member 38. This pulse is applied to the input 34 of the AND gate 33 (FIG. 4). The same effect could obviously alternatively be obtained with a monoflop which is tripped by the signal at the output Q1 changing from the value 1 to the value 0.

Now, if during this time a pulse is emitted at the output 3 of the Schmitt trigger 2, i.e., a signal value 1 is at the input 32 of the AND gate 33, said gate supplies to the control input 31 of the gate circuit 30 a control pulse for the duration of the delay of the delay member 38. This control pulse opens the gate circuit so that it allows the count reached at the end of the hold time of the monoflop 25 to pass to the decoder 14. The latter then emits a control signal at the output associated with this count. The signal value 1 present at the output of the AND gate 33 during the delay of the delay member 38 also passes directly to the input 40 of the NOR gate 41, at the other input 42 of which the signal value 0 is applied for the duration of the same pulse but with a delay determined by the delay member 43. Thus, in a manner similar to the circuits 35, 38, 39 the circuits 41, 43, 44 produce a short pulse which immediately follows the end of the output pulse of the AND gate 33 and appears at the output 23' of the sequence control circuit and is applied to the reset input 24 of the counter 11 (FIG. 4). This pulse resets the counter 11.

The hold time of the monoflop 29 is so set that it flops back into its quiescent state again only when the transfer process from the counter to the decoder via the gate circuit and the resetting of the counter has been effected. When the monoflop 29 returns to its quiescent state, it emits at its output Q2 the signal value 0 which brings the monoflop 25 via the input A1 thereof into such a condition that it can again be brought into its operating state by a pulse at the output 3 of the Schmitt trigger 2. In this manner the measuring and evaluating periods can be repeated for as long as useful frequency oscillations are supplied to the input 1.

In the circuit according to FIG. 3, interference frequencies are suppressed by setting a certain hold time of the monoflop 25. It is apparent from the above description of the function that the transfer of the count of the counter 11 to the decoder 14 takes place immediately following the end of the hold time of the monoflop 25, i.e., immediately following the end of the measuring time. However, a control signal initiating the transfer can be applied by the AND gate 33 to the control input 31 of the gate circuit 30 only when simultaneously with the end of the measuring time a pulse, i.e., the signal value 1, is present at the output 3 of the Schmitt trigger 2. Now, if the hold time of the monoflop 25 is made equal to the reciprocal of the channel spacing $\Delta f$, this coincidence at the AND gate 33 at the end of the measuring time occurs only when quite definite frequencies are applied to the input 1; these frequencies lie only within frequency bands which in the example described here, in which the output pulses of the Schmitt trigger 2 have a pulse duty factor of 1:2, have the width of half a channel spacing. These frequency bands each contain one of the useful frequencies. Between these frequency bands there are gaps having the width of half the channel frequency and frequencies falling in these gaps do not produce coincidence at the AND gate 33 and consequently cannot be evaluated by transfer of the count of the counter 11 to the decoder 14. Thus, frequency windows are formed over the entire frequency range which can occur at the input 1 and only frequencies lying within these windows are treated by the circuit according to FIG. 3 as useful frequencies. All intermediate frequencies are recognized as interference frequencies and excluded from evaluation.

If the measuring time is made exactly equal to the reciprocal of the channel spacing the frequency bands in which evaluation takes place are such that the rated frequencies of the signals transmitted by the transmitter are disposed at the lower end of the frequency bands. Thus, in this case only frequencies starting from a rated frequency in each case and extending up to the frequency in the center between two channels would be evaluated as useful frequencies. Since the frequency of the signals emitted by the transmitter can however also fluctuate below the rated frequency, it is desirable to place the frequency bands in which evaluation takes place so that the rated frequencies lie substantially in the center of the bands. To achieve this, the hold time of the monoflop 25 and thus the measuring time is lengthened by a quarter of the reciprocal of the maximum rated frequency. Although with this setting only the maximum rated frequency lies exactly in the center of the corresponding frequency band, the other rated frequencies still lie within the corresponding frequency bands and consequently the frequencies of the useful signals can also deviate from the rated frequency downwardly without preventing evaluation. The frequency gaps including the frequencies treated as interference frequencies then lie in each case substantially in the center between two rated frequencies.

Figure 5:
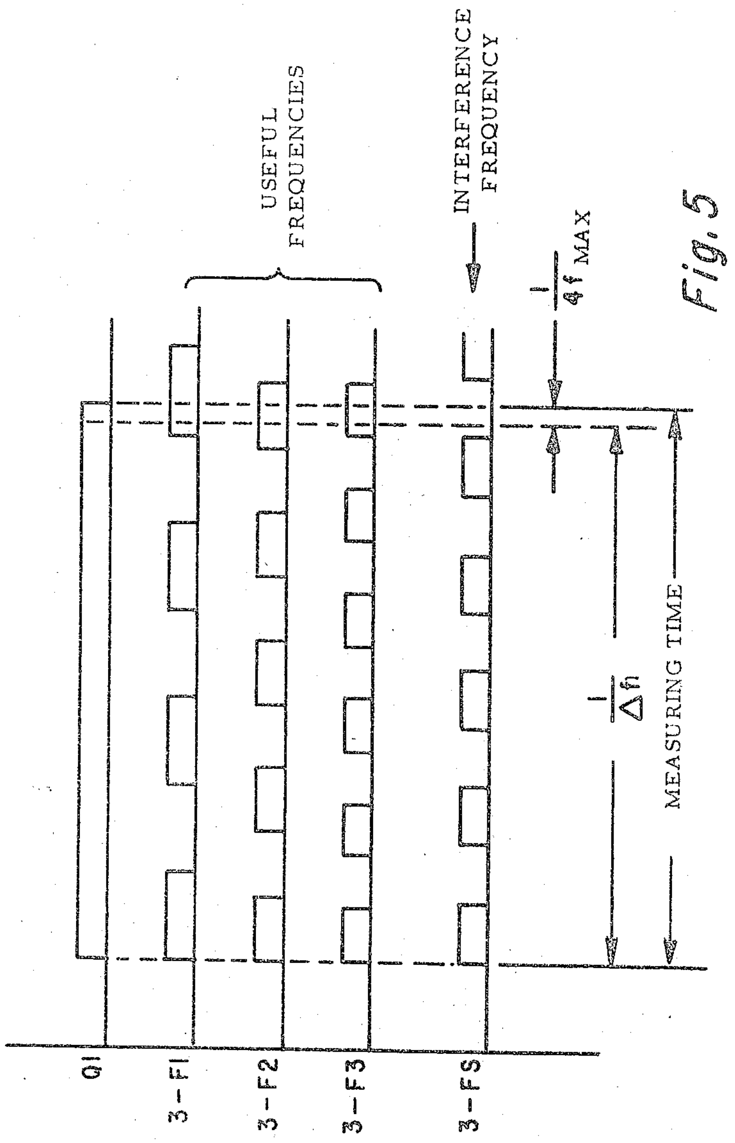
FIG. 5 is a diagram illustrating interference frequency identification in the circuit according to FIG. 3.

To facilitate understanding of the type of interference identification just outlined attention is drawn to FIG. 5; the latter shows at Q1 the output signal of the monoflop 25 determining the measuring time, at 3–F1, 3–F2, 3–F3 the pulse sequences appearing at the output 3 of the Schmitt trigger 2 for three different useful frequencies F1, F2, F3 and at 3–FS the pulse sequence which appears at the output 3 when an interference frequency FS is received which lies between the useful frequencies F2 and F3. It is apparent from this diagram that at the end of the measuring time a pulse is present at the output 3 of the Schmitt trigger only when useful frequencies are being received and that when an interference frequency is applied there is a pulse space at the end of the measuring time. Thus, at the AND gate 33 the presence of a pulse at the end of the measuring time is employed as criterion for the receipt of a useful frequency. It is also apparent from FIG. 5 that with the useful frequency F1 the counter 11 counts 4 pulses, with the useful frequency F2 up to 5 pulses and with the useful frequency F3 6 pulses.

Figure 6:
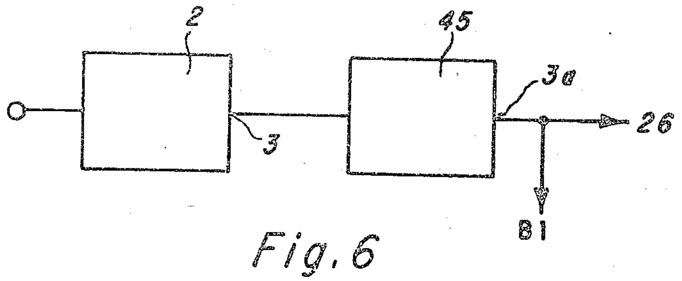
FIG. 6 shows a block circuit diagram of another embodiment of part of the circuit according to FIG. 3.
Figure 7:
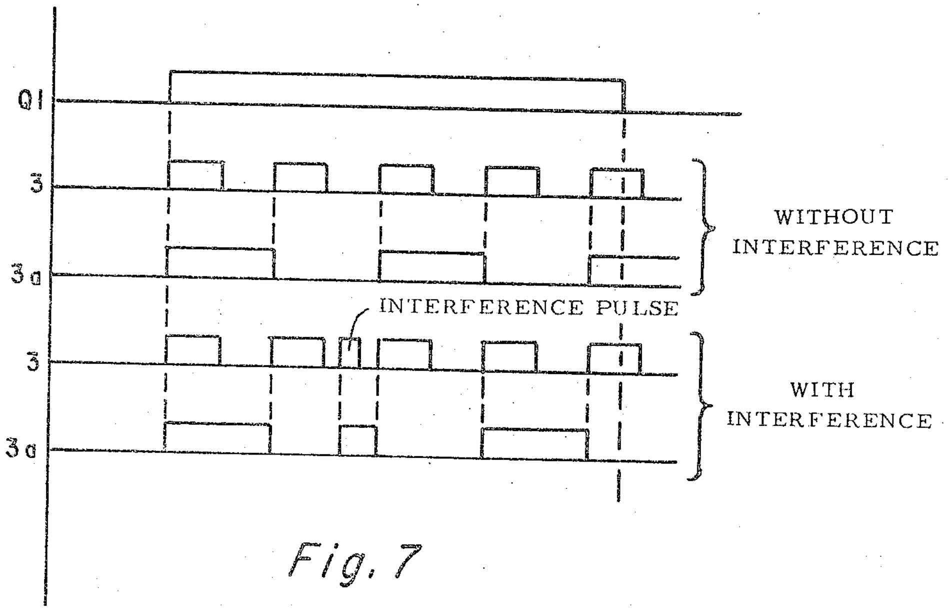
FIG. 7 is a diagram explaining the mode of operation of the embodiment according to FIG. 6.

Isolated short interference pulses which could reach the input 1 of the circuit of FIG. 3 between two useful pulses and undesirably increase the count may be made ineffective by inserting a flip-flop circuit 45 between the output 3 of the Schmitt trigger 2 and the rest of the circuit as illustrated in FIG. 6. The mode of operation of this flip-flop circuit 45 will be explained with the aid of FIG. 7, which shows the signals at the output 3 of the Schmitt trigger 2 and at the output 3*a* of the flip-flop circuit 45 firstly without interference and secondly with interference. The flip-flop circuit 45 is tripped by the leading edge of each output pulse of the Schmitt trigger 2. If a short interference pulse is received, the flip-flop circuit 45 supplies at its output 3*a* the signal value 0 for example on receipt of the useful pulse preceding the interference pulse, the signal value 1 on receipt of the interference pulse and the signal value 0 on receipt of the next useful pulse. If no interference pulse had occurred, the flip-flop circuit would not have been switched to the signal value 1 at the output until receipt of the next useful pulse. The flip-flop circuit thus effects on receipt of an interference pulse (and in general on receipt of an odd number of interference pulses) between two useful pulses a reversal of the signal values so that at the end of the measuring time coincidence is not reached at the gate 33 although a useful frequency was received. Without the flip-flop circuit 45 the count would be transferred, although because of the interference pulse received it would not correspond to the useful frequency received.

The embodiment of FIG. 3 differs from the embodiment of FIG. 1 also in that instead of the store (register) 12 the gate circuit 30 is used that allow the count to be evaluated to pass briefly only once in a measuring and evaluating time. Thus, at the output of the decoder 14, instead of a uniform signal as in the case of the embodiment of FIG. 1, a series of pulses appears with the spacing of the control signals at the input 31 of the gate circuit 30. The use of a gate circuit instead of a store is suitable in applications where the equipment to be controlled must be actuated with control pulses and not with a uniform signal.

Figure 8:
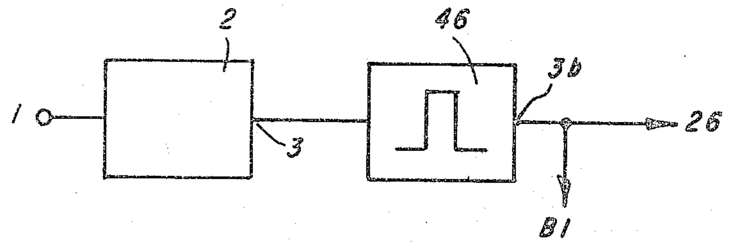
FIG. 8 is a block circuit diagram of a further embodiment of a part of the circuit according to FIG. and, an FIG. 9 is a diagram explaining the mode of operation of the embodiment according to FIG. 8.
Figure 9:
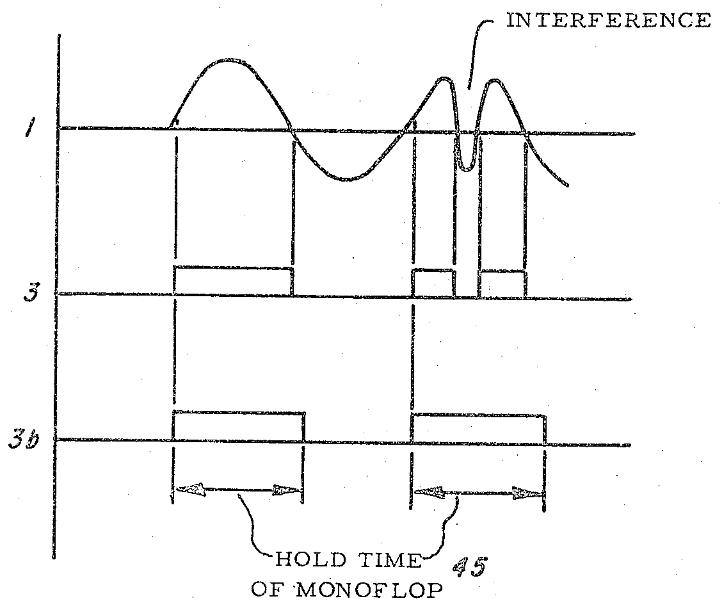

The immunity to interference may be further increased if in accordance with FIG. 8 a further monoflop 46 which cannot be triggered again during its hold time is inserted between the output 3 of the Schmitt trigger 2 (or the output 3*a* of the flip-flop circuit 45 of FIG. 6) and the remainder of the circuit. This hold time is set to half the period of the highest useful frequency. This modification is effective against a particular type of interferences, i.e., cases where an amplitude break occurs within an oscillation at the input 1 of the Schmitt trigger 2; this break would lead at the output 3 of the Schmitt trigger to the emission of two pulses instead of the single pulse per oscillation emitted in the normal case. These two pulses give the same effect as the receipt of a frequency which is twice as high and consequently without the additional monoflop 46 erroneous evaluations could arise. However, the monoflop 46 prevents the two pulses from becoming separately effective because it always emits pulses having the duration of its hold time; short double pulses which can arise due to amplitude breaks in the received signal thus cannot have any effect. FIG. 9 shows the action of the monoflop 46 when an amplitude break occurs at the input 1 of the Schmitt trigger 2 which produces a double pulse at the output 3 of the Schmitt trigger. As is apparent, the pulses at the output 3*b* of the monoflop 46 are not affected by this double pulse.

One embodiment of the remote control receiver may also reside in that a sequence control counter fed by the pulses at the output of the Schmitt trigger 18 is used for the sequence control device 17 of FIG. 1; the stage outputs of said counter are connected to a decoder which is so designed that it activates one after the other one of its outputs for each count. Thus, for example, this decoder may have 10 outputs which are activated successively in each counting period of the sequence control counter. Since in accordance with the description of the example of embodiment of FIG. 1 a total of three control signals are required for the evaluation of the frequency received, the output signals at the fourth, fifth and seventh outputs may be used respectively for activating the frequency divider 7, opening the store 12 and resetting the counter 11. Since in this case the evaluation of the received frequency by the control pulses emitted from the output of the decoder of the sequence control device does not begin until the decoder emits a signal at its fourth output, there is an evaluation delay which has the advantage that short interference pulses produce no response in the receiver.

The advantageous formation of frequency band windows are used in the embodiment of FIG. 3 can also be applied in the embodiment of FIG. 1 if instead of the retriggerable monoflop 5 a monoflop is used which has no dead time and which is not retriggerable again during its hold time which as in the monoflop 35 of FIG. 3 is made equal to the reciprocal of the channel spacing $\Delta f$. This monoflop thus always flops back into its quiescent state when there is a pulse pause at its input at the end of its hold time whereas it is returned to its operating state practically without dead time by a pulse applied to its input at the end of the hold time. Since a pulse at the input of the monoflop at the end of its hold time however occurs only for frequencies lying within the frequency bands mentioned in connection with the description of FIG. 3, only frequencies which lie within the frequency bands can be treated as useful frequencies. For all intermediate frequencies, the monoflop returns to its quiescent state in which it interrupts the sequence control device and thus prevents evaluation of said frequencies. For the same reasons as in the circuit of FIG. 3, in this case as well the hold time of the monoflop should be lengthened by a quarter of the reciprocal of the highest useful frequency.

The ultrasonic remote control receiver described above can be used not only to control television sets, radio sets and the like but is particularly suitable also for industrial use in which high immunity to interference is very important. It may, for example, be used for remote control of cranes on large building sites, where there are a great number of different interference sources. The ultrasonic remote control receiver according to the above description is so immune to interference that it operates satisfactorily even under the difficult conditions encountered in the aforementioned use.

The following table provides examples of integrated circuits from Texas Instruments Incorporated which may be used in the foregoing invention.

| | |
|---|---|
| Schmitt-triggers 2 and 18 | SNX 49713 |
| Monoflops 25, 29 and 46 | SN 74121 |
| Monoflop 5 | SN 74122 |
| Frequency divider 7 | SN 7492 |
| Counter 11 | SN 7490 |
| Store 12 | SN 7475 |
| Control 17 | SN 7476 |
| Gate 30 | SN 7432 |
| Decoder 14 | SN 7442 |

What is claimed is:

1. An ultrasonic remote control receiver for applying a control signal to a selected one of a plurality of control channels in response to and dependent on the frequency of a received ultrasonic signal comprising:
 a. pulse forming means producing pulses at a frequency directly related to the frequency of a received ultrasonic signal;
 b. counter means for counting pulses produced by said pulse forming means and providing a digital indication of the count when activated, said digital indication apearing as a combination of signals on a plurality of counter output lines less in number than said plurality of control channels;
 c. decoder means for activating one of a plurality of decoder output lines comprising said plurality of control channels in dependence on the digital indication of count receiver at its input:
 d. transfer means for periodically applying the count indication of said counter on said counter output lines to a corresponding plurality of lines comprising the input of said decoder; and,
 e. sequence control means for
  i. activating said counter for a predetermined period of time in response to the production of pulses by said pulse forming means;
  ii. activating said transfer means to apply said indication of count to said corresponding plurality of lines of said decoder means at the end of said predetermined period; and
  iii. thereafter resetting and reactivating said counter means.

2. An ultrasonic remote control receiver comprising:
 a. pulse forming means producing pulses at a frequency directly related to the frequency of a received ultrasonic signal;
 b. counter means for counting pulses produced by said pulse forming means and providing a digital indication of the count when activated;
 c. decoder means for activating one of a plurality of output lines in dependence on the digital indication of count received at its input;
 d. transfer means for periodically applying the count indication of said counter to the input of said decoder;
 e. sequence control means for
  i. activating said counter for a predetermined period of time in response to the production of pulses by said pulse forming means;
  ii. activating said transfer means to apply said indication of count to said decoder means at the end of said predetermined period and
  iii. thereafter resetting and reactivating said counter means; and
 f. means to interrupt operation of said sequence control means upon the termination of pulse output from said pulse forming means and to prevent transfer of said indication of count to said decoder.

3. An ultrasonic remote control receiver comprising:
 a. means for producing square wave pulses at the frequency of an incoming ultrasonic signal;
 b. frequency divider means receiving said square wave pulses and producing pulses of a submultiple frequency;

c. counter means receiving said pulses of a submultiple frequency and producing a digital indication of the count of submultiple frequency pulses received;
d. storage means receiving and storing said digital indication and producing said digital indication of count at its output when activated;
e. decoder means receiving said digital indication of count from said storage means and producing a signal at one of a plurality of control outputs in accordance with the value of said digital count received;

f. sequence control means responsive to timing and signal inputs and providing in sequence:
i. a pulse activating said frequency divider;
ii. a pulse activating said storage means; and
iii. a pulse resetting said counter means in response to a timing and signal input;
g. means producing timing pulses from received signals of a predetermined frequency and applying said pulses to said sequence control means; and
h. means providing a signal input to said sequence control means in response to the output of said means producing square wave pulses for the duration of the production of said square wave pulses.

4. The ultrasonic remote control receiver as defined in claim 3, wherein said means producing square pulses is a Schmitt trigger circuit and said means providing a signal input to said sequence controller is a retriggerable monostable multivibrator.

5. An ultrasonic remote control receiver comprising:

a. a pulse forming means producing a train of square wave pulses at the frequency of an incoming signal to be detected;
b. sequence control means responsive to said pulse train to produce a plurality of sequential output signals;
c. counter means for counting pulses received at an input and producing digital indication at its output of the number of pulses counted;
d. decoder means to receive said digital count indication and produce an output control signal at one of a plurality of outputs in dependence on the count indication received;
e. transfer means to transfer the digital indication at the output of said counter to the input of said decoder;

said sequence control means producing a first output signal effective to apply pulses of said pulse train to said counter for predetermined time periods during the production of said pulse train, a second output signal at the end of each of said predetermined time periods effective to activate said transfer means, but only when said predetermined time period terminates during one of the pulses of said pulse train, and a third output signal effective to reset said counter prior to the beginning of each of said predetermined time periods.

6. An ultrasonic remote control receiver comprising:

a. a Schmitt trigger circuit receiving incoming ultrasonic signals and producing square wave pulses at its output;
b. a first monostable multivibrator responsive to said square wave pulses to produce an output pulse of a predetermined duration;
c. a second monostable multivibrator interconnected with said first multivibrator to prevent retriggering of said first multivibrator for the duration of said output pulse and to terminate said output pulse upon cessation of square wave pulses;
d. an AND gate arranged to pass said square wave pulses to its output for the duration of the output pulses of said first multivibrator;
e. NOR gate means arranged to receive said output pulse of said first multivibrator and a delayed inversion of said output pulse of said first multivibrator and to produce at its output a gate pulse immediately after termination of said output pulse;
f. AND gate means arranged to produce a transfer pulse at its output upon receiving said gate pulse simultaneously with one of said square wave pulses;

g. NOR gate means arranged to receive said transfer pulse and a delayed inversion of said transfer pulse and to produce a reset pulse immediately after termination of said transfer pulse;
h. counter means receiving said square wave pulses passed by said first AND gate means and producing at its output a digital indication of the number of pulses received and responsive to said reset pulse to restart said count;
i. decoder means producing a control signal at one of a plurality of output lines in dependence on a digital indication at its input; and
j. gate circuit means to apply said digital indication at the output of said counter means to the input of said decoder means in response to said transfer pulse.

7. An ultrasonic remote control receiver as defined in claim 6 further comprising a monostable multivibrator between the output of said Schmitt trigger circuit and the remaining elements of said receiver.

8. An ultrasonic remote control receiver as defined in claim 6 further comprising a bistable multivibrator between the output of said Schmitt trigger circuit and the remaing elements of said receiver.

9. The ultrasonic remote control receiver as defined in claim 7 wherein the hold period of said monostable multivibrator is slightly less than one half the period of said square wave pulses from said Schmitt trigger circuit.

* * * * *